(12) United States Patent
Allen

(10) Patent No.: US 7,204,280 B2
(45) Date of Patent: Apr. 17, 2007

(54) VEHICLE COVER

(76) Inventor: John Ellis Allen, 31626 Bobcat Way, Castaic, CA (US) 91384

( * ) Notice: Subject to any disclaimer, the term of this patent is extended or adjusted under 35 U.S.C. 154(b) by 291 days.

(21) Appl. No.: 10/812,957

(22) Filed: Mar. 31, 2004

(65) Prior Publication Data

US 2005/0217772 A1  Oct. 6, 2005

(51) Int. Cl.
B65D 65/02 (2006.01)

(52) U.S. Cl. .................................... 150/166

(58) Field of Classification Search ............. 150/166, 150/136.1, 136.12, 136.13
See application file for complete search history.

(56) References Cited

U.S. PATENT DOCUMENTS

| | | | | |
|---|---|---|---|---|
| 1,559,458 A | * | 10/1925 | Rizianu | .................... 150/166 |
| 2,646,097 A | * | 7/1953 | Gaverth et al. | ............. 150/166 |
| 4,842,324 A | | 6/1989 | Carden | |
| 4,867,216 A | | 9/1989 | McKee | |
| 4,948,191 A | * | 8/1990 | Cao | ..................... 296/95.1 |
| 4,972,892 A | * | 11/1990 | Yeh | ........................ 150/166 |
| 5,102,183 A | | 4/1992 | Swartz | |
| 5,191,849 A | * | 3/1993 | Labrucherie et al. | ...... 114/61.2 |
| 5,328,230 A | * | 7/1994 | Curchod | ................ 296/136.04 |
| 5,356,191 A | | 10/1994 | Sheehan | |
| 5,364,156 A | | 11/1994 | Zerow | |
| 5,368,912 A | * | 11/1994 | Reaves | ........................ 428/192 |
| 5,409,286 A | * | 4/1995 | Huang | .................... 296/136.04 |
| 5,429,406 A | | 7/1995 | Huang | |
| 5,456,515 A | | 10/1995 | Dang | |
| 5,476,127 A | | 12/1995 | Fournier | |
| 5,490,707 A | | 2/1996 | De La Cruz | |
| 5,927,793 A | * | 7/1999 | McGrath, Jr. | .......... 296/136.13 |

* cited by examiner

*Primary Examiner*—Tri M. Mai
(74) *Attorney, Agent, or Firm*—Dennison, Schultz & MacDonald

(57) ABSTRACT

The present invention provides a vehicle cover having a main cover portion with a plurality of peripheral edges, a fastening band attached along the plurality of peripheral edges which runs across the windshield, a pair of fastening band extensions extending under the side mirrors of the vehicle, and the fastening band extending down the length of the cover's side to secure the front end of the cover to the vehicle, and an anchoring means attached to the rear of the vehicle cover for securing the rear end of the cover to the trunk lid or a license plate frame.

10 Claims, 5 Drawing Sheets

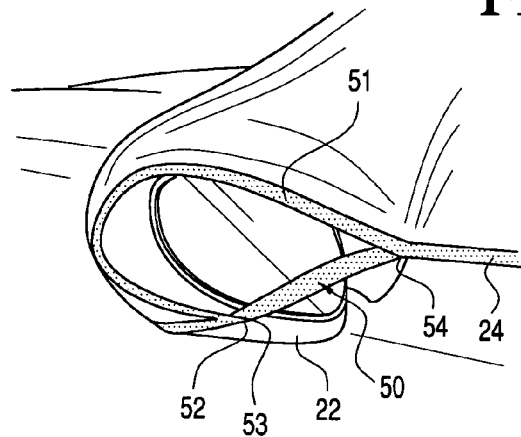
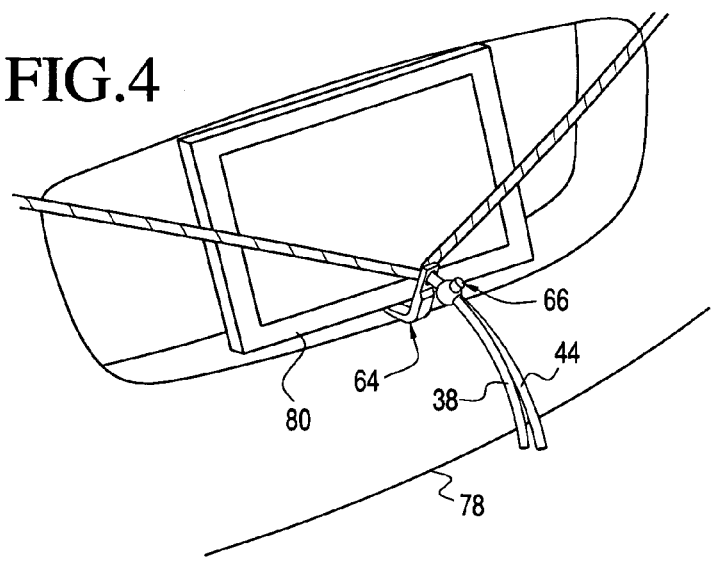
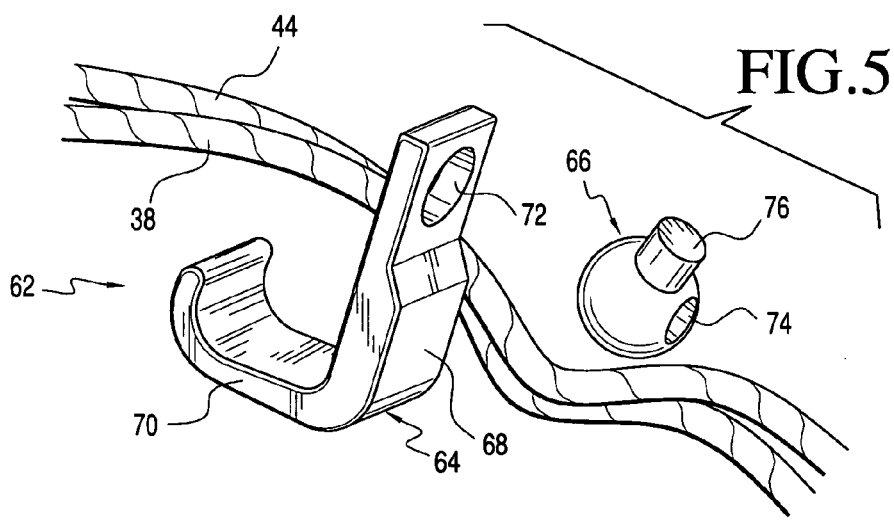

VEHICLE COVER

TECHNICAL FIELD

The present invention is directed toward vehicle covers and, more particularly, to a lightweight and easy-to-use vehicle cover for protecting the vehicle's interior by covering the windows and windshield.

BACKGROUND OF THE INVENTION

Many prior art vehicle covers have been developed in recent years for various purposes. Most of these covers are designed to simply protect a vehicle's exterior.

A number of vehicle covers, however, have been designed to usually cover the vehicle's roof, the front windshield, the side windows, and the rear window.

One of the disadvantages associated with these prior art covers is the way they are held in place over the vehicle and the windows. Such ways or methods include using straps running from the corners of the cover to the four wheelwells, placing magnets within the cover hem to attract the metal portions of the vehicle, flaps extending from portions of the cover and secured within door jams and the trunk lid, and weights used in the front and the corners of the cover.

It is therefore a primary object of the present invention to provide a vehicle cover which is easy to use and store.

It is another object of the present invention to provide a vehicle cover for covering vehicle windows which can be securely fastened and adjusted on a variety of vehicle shapes and sizes within a size range.

SUMMARY OF THE INVENTION

These problems and others are addressed by the present invention which comprises The present invention provides a vehicle cover having a main cover portion with a plurality of peripheral edges, a fastening band attached along the plurality of peripheral edges which runs across the windshield, a pair of fastening band extensions extending under the side mirrors of the vehicle, and the fastening band extending down the length of the cover's side to secure the front end of the cover to the vehicle, and an anchoring means attached to the rear of the vehicle cover for securing the rear end of the cover to the trunk lid or a license plate frame.

BRIEF DESCRIPTION OF DRAWINGS

These and other objects of the present invention will be appreciated and understood by those skilled in the art from the detailed description of the preferred embodiments of the invention and the following drawings of which:

FIG. 3 is a perspective view of a securing means for securing the front end of the vehicle cover over a vehicle side mirror, and a cover adjusting means to fit the cover to a variety of vehicle sizes;

FIG. 4 is a perspective view of an anchoring means for securing the rear end of the vehicle cover of the present invention to a rear license plate frame;

FIG. 5 an exploded view of the anchoring means for the vehicle cover of the present invention;

DETAILED DESCRIPTION OF THE INVENTION

Figure 1:
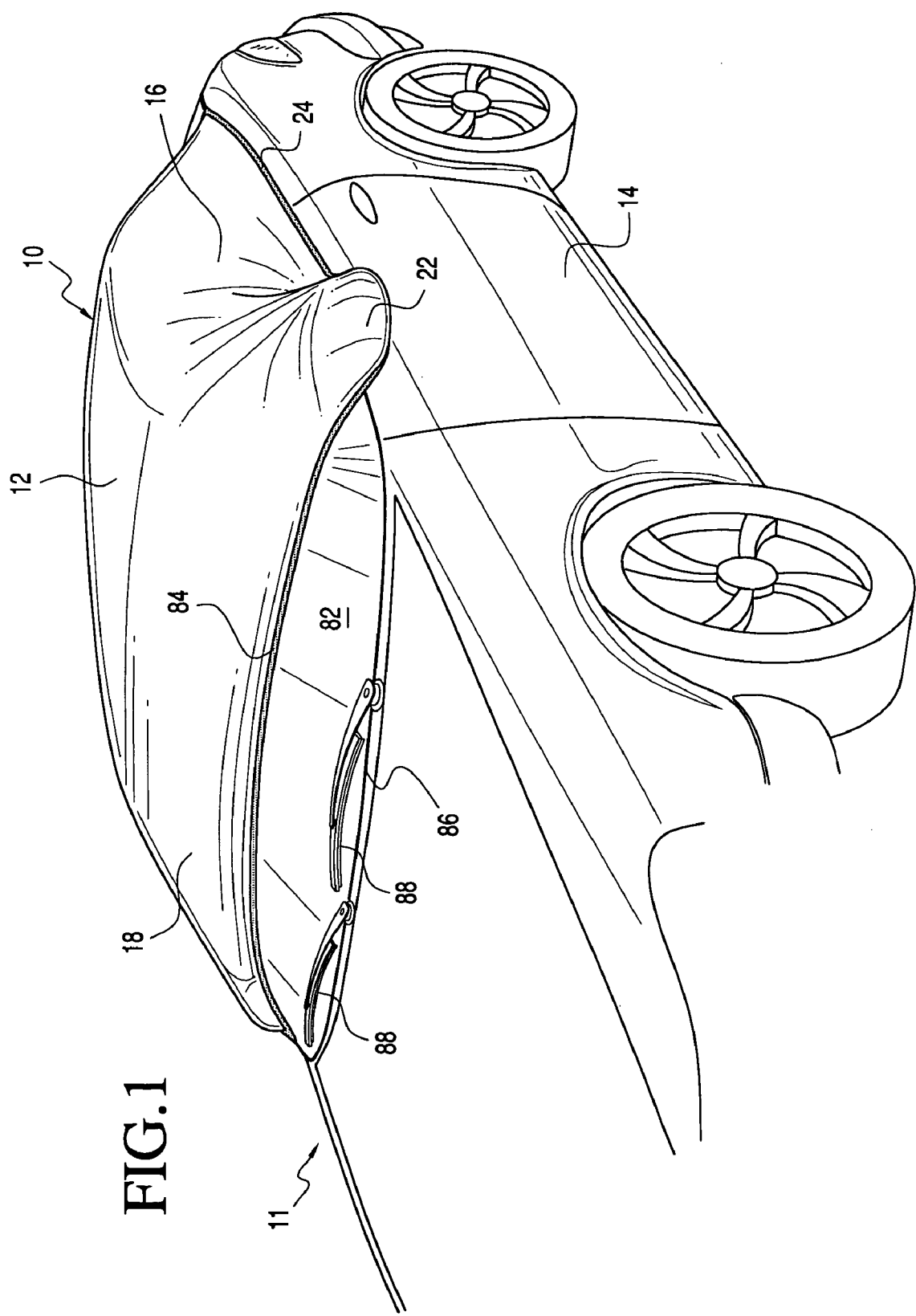
FIG. 1 is a front perspective view of the vehicle cover according to the present invention in a deployed configuration over a vehicle.
Figure 2:
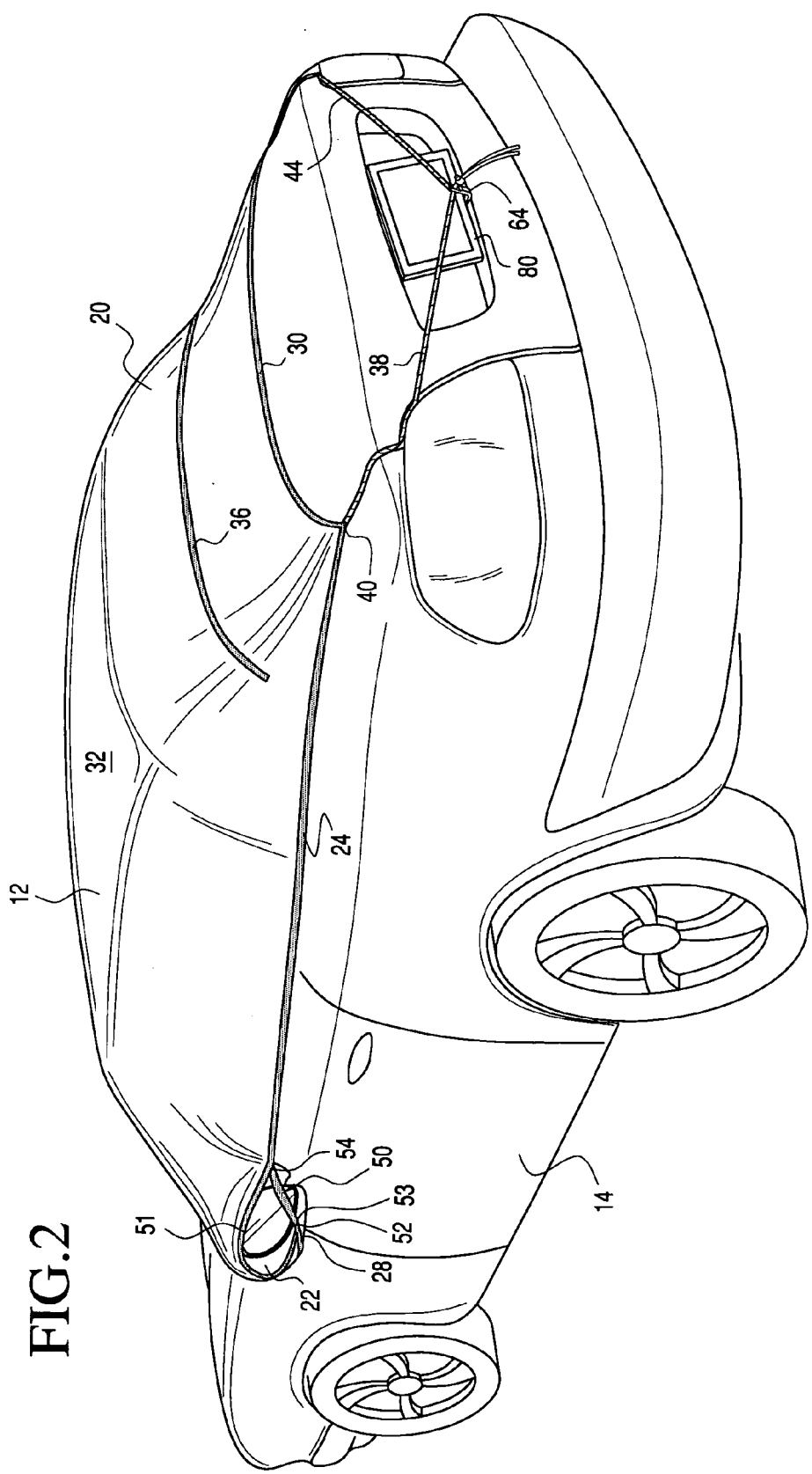
FIG. 2 is a rear perspective view of the vehicle cover of FIG. 1 in a deployed configuration.
Figure 6:
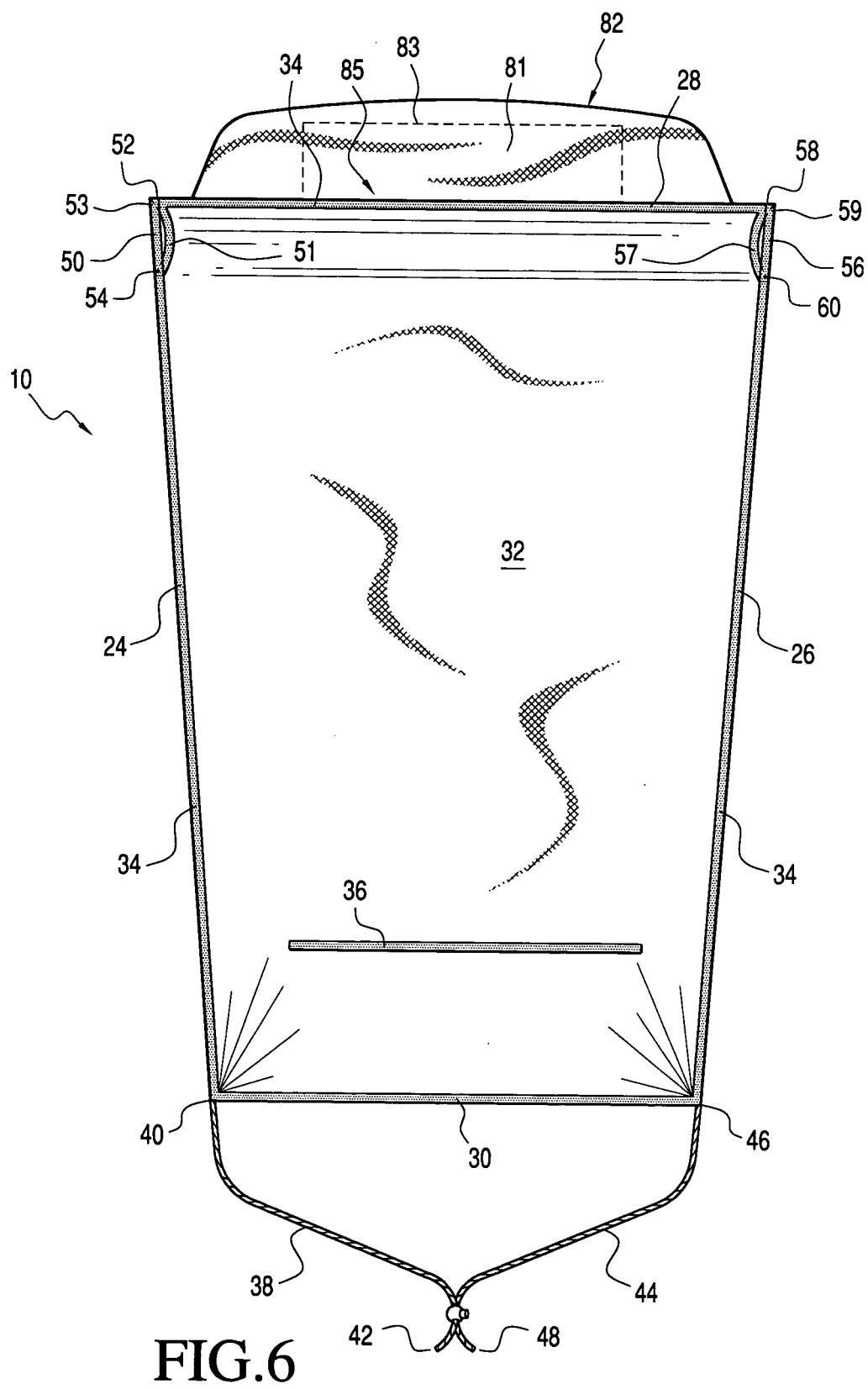
FIG. 6 is a top plan view of the vehicle cover according to the present invention.

For the purpose of promoting and understanding of the principles of the invention, reference will now be made to the embodiments illustrated in the drawings. Referring now to the drawings, and more specifically FIGS. 1, 2, and 6, wherein the showings are for the purpose of illustrating the preferred embodiment of the invention only and not for the purpose of limiting the same, a vehicle cover 10 is shown for use for a sedan or a coupe vehicle 11 having a roof 12, a plurality of doors 14, a plurality of side windows 16, a front windshield 18, a rear window 20, and a pair of side mirrors 22.

The vehicle cover 10 includes a first peripheral edge 24, a second peripheral edge 26, a third peripheral edge 28, and a fourth peripheral edge 30 bounding a main cover portion 32, wherein the first and the second peripheral edges 24, 26 are substantially parallel to one another, and wherein the third and the fourth peripheral edges 28, 30 are parallel to one another. Elastic is preferably stitched into the entire length of the third and fourth peripheral edges 28, 30. The vehicle cover 10 is preferably made of a light layer water resistant and UV resistant material.

Referring now to FIGS. 2, 3, and 6, the vehicle cover 10 further includes a continuous fastening band 34 created in part by the hem of the vehicle cover 10 preferably along the first, the second, and the third peripheral edges 24, 26, 28. The third peripheral edge 28 includes a first end 52 and a second opposing end 58.

A first fastening band extension 50 includes a first end 53 and an opposing second end 54, and a second fastening band extension 56 includes a first end 59 and an opposing second end 60. Moreover, the continuous fastening band 34 is created by attaching the first fastening band extension 50 to the cover in such a manner that the first end 53 of the first fastening band extension 50 is attached to the first end 52 of the third peripheral edge 28 and the second end 54 of the first fastening band extension 50 is attached to the first peripheral edge 24. Similarly, on the opposite side of the cover, the continuous fastening band 34 is created by attaching the second fastening band extension 56 to the cover in such a manner that the first end 59 of the second fastening band extension 56 is attached to the second end 58 of the third peripheral edge 28 and the second end 60 of the second fastening band extensions 56 is attached to the second peripheral edge 26. It is noted that the attachment of the first and the second fastening band extensions 50, 56 as described is preferably done by, but not limited to, stitching.

The first and the second fastening band extensions 50, 56 are each approximately four inches in length. As will be explained in greater detail, the first fastening band extension 50 may be made of elastic material and used for pulling and tensioning the third peripheral edge 28 under the driver side mirror 22, and the second fastening band extension 56 may be made of elastic material and used for pulling and tensioning the third peripheral edge 28 under the passenger side mirror 22 when the vehicle cover 10 is in a deployed and in use configuration.

It is noted that the length of the first fastening band extension 50 is shorter than the length of a portion 51 of the first peripheral edge 24 between the first end 53 of the first fastening band extension 50 and the second end 54 of the first fastening band extension 50, and the length of the second fastening band extension 56 is shorter than the length of a portion 57 of the second peripheral edge 26 between the first end 59 of the second fastening band extension 56 and the second end 60 of the second fastening band extension 56 thereby creating a bowed configuration in the front end of the vehicle cover 10 and allowing for excess vehicle cover 10 material to gather at this position. In the preferred embodiment, the length of the portion 51 and 57 is about twenty inches. Moreover, elastic is preferably stitched into the entire length of portions 51 and 57.

An elastic strip 36 is attached preferably by, but not limited to, stitching, on the main cover portion 32 adjacent and parallel to the fourth peripheral edge 30 extending substantially between the first peripheral edge 24 and the second peripheral edge 26. In the preferred embodiment, the distance between the elastic strip 36 and the fourth peripheral edge 30 is about fourteen inches, As will be explained in greater detail herein, the elastic strip 36 is laid over the rear window 20 when the vehicle cover 10 is placed over the vehicle 11.

Furthermore, the fastening band 34 further comprises a first cord 38 having a first end 40 and a second end 42, and a second cord 44 having a first end 46 and a second end 48. The first and the second cords 38, 44 are preferably nylon braided cords. The first end 40 of the first cord 38 is attached preferably by, but not limited to, stitching, to an intersecting corner of the first peripheral edge 24 and the fourth peripheral edge 30. Similarly, the first end 46 of the second cord 44 is attached preferably by stitching to an intersecting corner of the second peripheral edge 26 and the fourth peripheral edge 30.

Referring now to FIGS. 4, 5, and 6, an anchoring means 62 comprises a hook portion 64 and a cord lock mechanism 66. The hook portion 64 includes a vertical segment 68 and a horizontal segment 70 perpendicular to and integral with the vertical segment 68. The vertical segment 68 includes an aperture 72 dimensioned and configured for receiving the first and the second cords 38, 44 therethrough.

Moreover, the cord lock mechanism 66 comprises an aperture 74 also dimensioned and configured to receive the first and the second cords 38, 44 therethrough, and a spring biased operating button 76 for securing cord lock mechanism 66 on the first and the second cords 38, 44 at a desired location. The cord lock mechanism 66 is slideable and adjustable along the length of the first and the second cords 38, 44, and as will be explained herein, once the vehicle cover 10 is in a use position, the hook portion 64 rests against the cord lock mechanism 66 preventing the hook portion 64 from sliding along the first and the second cords 38, 44. The horizontal segment 70 of the hook portion 64 is placed along a trunk lid lower edge 78, or in the alternative, along a license plate frame lower edge 80, or any other desired location such as, but not limited to, the rear bumper.

Referring now to FIGS. 1 and 6, the vehicle cover further includes a front windshield flap 82, preferably made of the same material as the vehicle cover 10 and having a first edge 84 attached to the third peripheral edge 28 of the vehicle cover 10 and spanning substantially the width thereof, and a second edge 86 extending to substantially abut the lower edge of the front windshield 18. The vehicle's windshield wipers 88 are then placed over the windshield flap 82.

The vehicle cover 10 further includes a pouch 81 attached, preferably by stitching, to an undersurface of the windshield flap 82 along edges 83 and have an opening 85 for providing access to a storage area. The vehicle cover 10 may then be rolled up and placed inside the pouch 81 for storage and carrying.

In use, the vehicle cover 10 is placed over the upper cab portion of the vehicle 11 such that the main cover portion 32 is laid over the vehicle roof 12, and the third peripheral edge 28 spans across the front windshield 18. The cover 10 is pulled on the driver side so that the portion 51 of the first peripheral edge 24 is substantially placed over the driver side mirror 22 with the first fastening band extension 50 positioned at the undersurface of the side mirror 22, and the first peripheral edge 24 extending along the lower edges of the side windows 16. Similarly, the cover 10 is pulled on the passenger side so that the portion 57 of the second peripheral edge 26 substantially is placed over the passenger side mirror 22 with the second fastening band extension 56 positioned at the undersurface of the passenger side mirror 22, and the second peripheral edge 26 extending along the lower edges of the side windows 16. It is noted that the side mirrors 22 do not extend outwardly through the opening created between the first fastening band extension 50 and portion 51, and the passenger side mirror 22 does not extend outwardly through the opening created between the second fastening band extension 56 and portion 57.

The elastic strip 36 spans over the rear window 20, and the fourth peripheral edge 30 spans over the trunk lid. The first cord 38 is slid through the gap between the trunk lid side edge and rear fender with its second end 42 inserted through the hook portion aperture 72 and then cord lock mechanism aperture 74. The second cord 44 is slid through the gap between the trunk lid side edge and rear fender with its second end 48 inserted through the hook portion aperture 72 and then cord lock mechanism aperture 74. The first and second cords 38, 44, which are part of the fastening band 34 and spans the length of the first and second peripheral edge 24, 26, are then pulled to provide a taut fit for the cover 10 over the vehicle 11. As tension is applied to the first and second cords 38, 44 the fastening band 34 pulls the third peripheral edge 28 tightly across the windshield 18 and under the side mirrors 22 securely fastening the front of the cover 10 to the vehicle 11. As this tension is applied, portion 51 of the first peripheral edge 24 and portion 57 of the second peripheral edge 26 are drawn further over the side mirrors 22, adjusting the cover's width to fit the shape and size of the vehicle 11, giving the cover 10 a custom fit appearance. The hook portion 64 is then placed underneath the trunk lid lower edge 78 or the license plate frame lower edge 80 and secured in that position by the cord lock mechanism 66.

Figure 7:
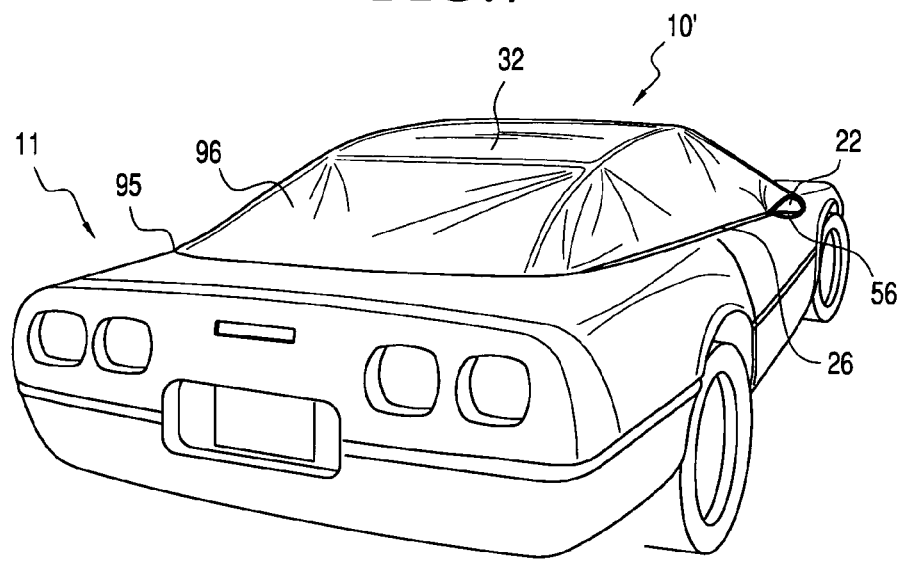
FIG. 7 is a perspective view of a second representative embodiment of the vehicle cover used for a hatchback vehicle; and, FIG. 8 is a bottom view of a corner securing means for the vehicle cover according to the second representative embodiment shown in FIG. 7.
Figure 8:
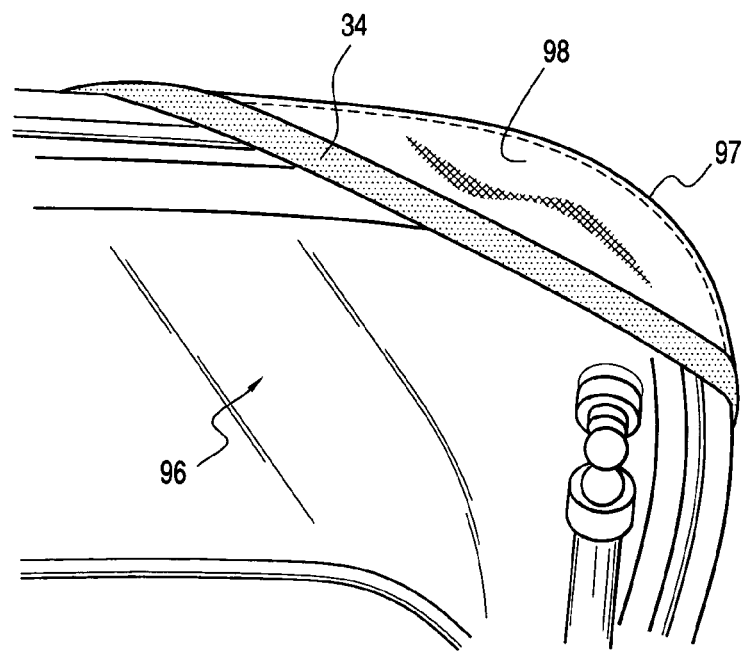

Referring now to FIGS. 7 and 8, a second representative embodiment of the vehicle cover is illustrated at 10'. The vehicle cover 10' is substantially similar to that of the preferred embodiment, without the use of the hook portion anchoring means, and it is used on vehicles without a conventional trunk lid such as, but not limited to, a hatchback vehicle having a rear hatch door 96. Elements of the vehicle cover, which are similar to those in the preferred embodiment are designated by the same reference numerals.

The vehicle cover 10' includes a pair of pocket portions 98 each formed by folding over the intersecting corners of the second and the third peripheral edges 26, 30, for the passenger side, and by folding over the intersecting corners of the first and the fourth peripheral edges 24, 30 for the driver side. The cover 10' is modified at this location to conform to the shape of the hatch 96 at each corner 95, 97. The fastening band 34 on the second peripheral edge 26 is preferably stitched to the fasting band 34 on the fourth peripheral edge 30. Similarly, the fastening band 34 on the first peripheral edge 24 is preferably stitched to the fasting band 34 on the fourth peripheral edge 30. Elastic is preferably stitched into the portion of the fastening band at the pocket portion 98 on the passenger side and similarly into the pocket portion 98 on the driver side. This creates a continuous fastening band around the vehicle which also includes the third peripheral edge 28 and the two fastening band extensions 50, 56.

The first pocket portion 98 is slid over the first corner 97 of the rear hatch door 96 and the opposing second pocket portion 98 is slid over the second corner 95 of the rear hatch door 96. When the rear hatch door 96 is closed, the cover 10' is securely fastened to the rear hatch door 96.

While preferred embodiments of the invention have been shown and described, various modifications and substitutions may be made thereto without departing from the spirit and scope of the invention. Accordingly, it is to be understood that the present invention has been described by way of illustration only, and this description should not be construed as limiting to the several claims appended hereto.

What is claimed is:

1. A vehicle cover, comprising:
   a main cover portion having a front hem, a first side peripheral edge, a second side peripheral edge, and a rear peripheral edge;
   a first front hem extension attached to and extending from said front hem to said first side peripheral edge creating a continuous hem, said first front hem extension being dimensioned and configured to create a first bowed section of the cover having a fluff portion with an opening between said fluff portion and said front hem extension,
   a second front hem extension attached to and extending from said front hem to said second side peripheral edge opposite said first front hem extension and creating a continuous hem, said second front hem extension being dimensioned and configured to create a second bowed section of the cover having a fluff portion with an opening between said fluff portion and said front hem extension,
   wherein a continuous hem is created along said front hem, said first front hem extension, said first side peripheral edge, said second front hem extension, and said second side peripheral edge,
   wherein said first bowed section is anchored over a first side mirror as said first front hem extension extends underneath the first side mirror, and said second bowed section is anchored over a second side mirror as said second front hem extension extends underneath the second side mirror, and,
   a pair of fastening cords attached to opposing ends of said first and said second side peripheral edges adjacent said rear peripheral edge, whereby pulling said pair of fastening cords said continuous hem is pulled around the vehicle creating a form fitting configuration of the cover and securing thereof over the vehicle.

2. The vehicle cover of claim 1, wherein elastic is attached along a length of said first bowed section.

3. The vehicle cover of claim 1, wherein elastic is attached along a length of said second bowed section.

4. The vehicle cover of claim 1, wherein said anchoring means further comprises a hook portion having an aperture, and a cord lock mechanism having an aperture.

5. The vehicle cover of claim 1, further comprising an elastic strip attached to said main cover portion parallel to said rear peripheral edge and extending substantially between said first side peripheral edge and said second side peripheral edge.

6. The vehicle cover of claim 1, further comprising a windshield flap having a first edge and a second edge, wherein said first edge is attached to said front hem.

7. The vehicle cover of claim 6, further comprising a pouch attached to said windshield flap.

8. The vehicle cover of claim 1, further comprising an anchoring means attached to said pair of fastening cords, and furthering comprising a knot or a sphere-shaped object for securing along the inside edge of a trunk door in a closed position, thereby preventing the vehicle cover from being removed or stolen.

9. The vehicle cover of claim 8, wherein the first cord of said pair of fastening cords includes a first end attached said rear peripheral edge and a second free end, the second cord of said pair of fastening cords includes a first end attached to said rear peripheral edge and a second free end, wherein said first cord second free end is inserted through said hook portion aperture and said cord lock mechanism aperture, and said second cord second end is insert through said hook portion aperture and said cord lock mechanism aperture, and wherein said hook portion is secured to an undersurface of a vehicle trunk lid.

10. The vehicle cover of claim 9, wherein said first and second cords are extended within a corresponding gap between a trunk door in a closed position and a rear fender of the vehicle.

* * * * *